US009487216B2

(12) United States Patent
Storm et al.

(10) Patent No.: US 9,487,216 B2
(45) Date of Patent: Nov. 8, 2016

(54) METHOD FOR DETERMINING ENERGY EFFICIENCY OF AN ENERGY SYSTEM IN A HYBRID VEHICLE

(71) Applicant: VOLVO TRUCK CORPORATION, Göteborg (SE)

(72) Inventors: Jonas Storm, Hisings Backa (SE); Jörgen Kjellberg, Torslanda (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/781,621

(22) PCT Filed: Apr. 2, 2013

(86) PCT No.: PCT/EP2013/000967
§ 371 (c)(1),
(2) Date: Oct. 1, 2015

(87) PCT Pub. No.: WO2014/161557
PCT Pub. Date: Oct. 9, 2014

(65) Prior Publication Data
US 2016/0039427 A1    Feb. 11, 2016

(51) Int. Cl.
*B60W 40/12*     (2012.01)
*B60L 3/12*      (2006.01)
(Continued)

(52) U.S. Cl.
CPC ............. *B60W 40/12* (2013.01); *B60L 3/12* (2013.01); *B60L 7/10* (2013.01); *B60L 7/12* (2013.01);
(Continued)

(58) Field of Classification Search
CPC .................................. B60W 40/12; B60L 3/12
See application file for complete search history.

(56) References Cited

U.S. PATENT DOCUMENTS 6,149,544 A * 11/2000 Masberg ............... B60K 6/26
                                              180/65.25
6,813,553 B2 * 11/2004 Nakamura ............ B60L 7/16
                                              303/112
(Continued)

FOREIGN PATENT DOCUMENTS

EP     2502774 A1     9/2012
WO  2012097349 A2     7/2012

OTHER PUBLICATIONS

International Search Report (Nov. 29, 2013) for corresponding International App. PCT/EP2013/000967.

*Primary Examiner* — Thomas Tarcza
*Assistant Examiner* — Alex C Dunn
(74) *Attorney, Agent, or Firm* — WRB-IP LLP

(57) ABSTRACT

A method for determining the efficiency of an electric energy system of a hybrid vehicle includes determining a measure representative of a relation between the electrical brake energy and the mechanical brake energy, by determining a requested brake energy for a first vehicle retardation, and by determining an actual electrical brake energy and the actual mechanical brake energy during the vehicle retardation, determining a new measure representative of a relation between the electrical brake energy and the mechanical brake energy at a subsequent second similar vehicle retardation, comparing the determined measures representative of a relation between the electrical brake energy and the mechanical brake energy of the first and second vehicle retardations, where the actual efficiency of the energy system is obtained from the change in the measure representative of a relation between the electrical brake energy and the mechanical brake energy of the first and second vehicle retardations.

19 Claims, 2 Drawing Sheets

(51) Int. Cl.
*B60L 7/12* (2006.01)
*B60L 7/26* (2006.01)
*B60L 11/14* (2006.01)
*B60L 11/18* (2006.01)
*B60L 15/20* (2006.01)
*B60W 30/18* (2012.01)
*B60L 7/10* (2006.01)
*B60W 20/00* (2016.01)
*B60W 50/00* (2006.01)

(52) U.S. Cl.
CPC .......... *B60L 7/26* (2013.01); *B60L 11/14* (2013.01); *B60L 11/1851* (2013.01); *B60L 11/1857* (2013.01); *B60L 11/1861* (2013.01); *B60L 11/1877* (2013.01); *B60L 15/2009* (2013.01); *B60W 20/00* (2013.01); *B60W 30/18127* (2013.01); *B60L 2200/36* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60W 2050/0089* (2013.01); *B60W 2510/248* (2013.01); *B60W 2530/14* (2013.01); *B60Y 2300/89* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01); *Y10S 903/947* (2013.01)

(56) References Cited

U.S. PATENT DOCUMENTS

| | | | | |
|---|---|---|---|---|
| 6,842,673 | B2 * | 1/2005 | Zhang | B60K 6/48 180/65.25 |
| 7,136,737 | B2 * | 11/2006 | Ashizawa | B60L 7/26 303/152 |
| 8,521,350 | B2 * | 8/2013 | Minamiura | B60T 1/10 303/124 |
| 2012/0226402 | A1 | 9/2012 | Minamiura | |

\* cited by examiner

METHOD FOR DETERMINING ENERGY EFFICIENCY OF AN ENERGY SYSTEM IN A HYBRID VEHICLE

BACKGROUND AND SUMMARY

The present invention relates to a method for determining the energy efficiency of the energy system in a hybrid vehicle.

Vehicles and vehicle components are tested during manufacture of the vehicle. Most components can be tested and verified at the sub-supplier when the component is manufactured. However, many components are comprised in a system in which several different components make up the system. Such a system can only be tested and verified when completely assembled. Some system can only be tested and verified when mounted on the vehicle, since they require input from other systems.

Some components and systems have greater deviations than other. It is e.g. fairly easy and cost-effective to manufacture valves within tight tolerances, but more difficult or impossible to manufacture an electrical component within a specified tolerance, especially batteries. The only way to arrive at a required tolerance may then be to manufacture several components and to thereafter measure all components and to group them in different component classes having different tolerances. This is a costly and time-consuming operation. Further, this grouping may only be valid when the component is new, since different components may age differently. Even if a new component was within tolerance, it may be seen as out of tolerance when measured after use. In order to comply with given tolerances or requirements, some components or systems are mounted on the vehicle and are thereafter adjusted to a specific tolerance.

Some components are known to degrade with age. The exact degradation may not be known, but for some components or systems, it is possible to predict a fairly reliable degradation, e.g. by taking account on environmental factors, time and amount of use. For some components, this works fine, e.g. for mechanical components. For some components, e.g. lamps, it is more or less impossible to predict the degradation and the end of life when the lamp breaks.

For other components, like batteries, it is possible to predict the degradation with a fairly high precision, when external parameters are used to modify the degradation behaviour. Such parameters that affect the degradation are e.g. temperature, state of charge, total current flow in and out of the battery, maximal current flow in and out of the battery, life length, etc. The condition of a battery is often referred to as the State of health (SOH), where the actual condition of a battery, e.g. a battery cell or a battery pack, is compared to its ideal condition. The unit of SOH is percent points, where 100% means that the actual battery condition match the battery specification.

Normally, the SOH will be 100% at the time of manufacture and will decrease over time and use. However, the performance of a battery at the time of manufacture may not meet its specifications, in which case the initial SOH will be less than 100%. Some batteries may also have a SOH that exceeds 100%. In order to monitor the condition of the batierv in a vehicle, the SOH is monitored or estimated during use. Different parameters are used to estimate and define the SOH. The following parameters can be used singly or in combination to define a value for the SOH of a battery: internal resistance, capacity, voltage, self-discharge, ability to accept a charge or the number of charge-discharge cycles performed. Different manufactures may use a different definition of the SOH. When several parameters are used, weight for each of the parameter's contribution to the SOH value may also differ.

In order to protect the battery from overload, an estimated degradation of the SOH is applied to the battery, which means that capacity of the battery is decreased over time. If the SOH for a new battery is 100%, it may be set to 80% after one year. The advantage of limiting the SOH of a used battery is to protect it. By limiting the maximum power into the battery, an overload of the battery can be avoided. However, since the degradation of the SOH is estimated and since this degradation is equal for all similar batteries, the estimation, must be on the safe side such that no batteries are overloaded. This may lead to that some batteries are limited more than necessary.

It would thus be of advantage to find a way to determine the efficiency of an energy system of a hybrid vehicle over time.

It is desirable to provide an improved method for determining the efficiency of an energy system of a hybrid vehicle over time, it is also desirable to provide a hybrid, vehicle comprising a control unit adapted to determine the efficiency of an electric energy system of the vehicle.

In a method for determining the efficiency of an electric energy system of a hybrid vehicle comprising a combustion engine, an electric machine, service brakes and an electric storage system, the steps of determining a requested brake energy for a first vehicle retardation and determining an actual electrical brake energy in an electric machine of the hybrid vehicle and an actual mechanical brake energy in service brakes of the hybrid vehicle during the vehicle retardation, determining a measure representative of a relation between, the electrical brake energy and the mechanical brake energy, determining a new measure representative of a relation between the electrical brake energy and the mechanical brake energy at a subsequent similar vehicle retardation, comparing the determined measures representative of a relation between the electrical brake energy and the mechanical brake energy of the first and second vehicle retardations, where the actual efficiency of the energy system is obtained from, the change in the measure representative of a relation between the electrical brake energy and the mechanical brake energy of the first and second vehicle retardations are comprised. By this first embodiment of the method, the method can determine the efficiency of an energy system of a hybrid vehicle. The energy system is preferably a battery connected to an electric machine. The electric machine is used as an electric motor to power the vehicle and as a generator to charge the battery when the vehicle retards, it is also possible to charge the battery when the vehicle is powered by the combustion engine and is travelling on a relatively even road. When the vehicle retards, the electric machine will be used as an electric brake that regenerates the battery. When the SOH of the battery is high, i.e. when the battery is new, the battery will be able to receive more power than when the battery has been used for a few years. By e.g. comparing the ratio of available electrical brake energy and mechanical brake energy, the actual efficiency or SOH of the battery can be determined instead of using a predefined degradation figure for the SOH. In this way, the battery of a vehicle can be monitored individually, and the charging/discharging properties can be adapted to the actual condition of the battery. This may allow for a prolonged life of the battery. In further embodiments, the measure representative of a relation between the electrical brake energy and the mechanical brake energy can be one of:
  the ratio between the electrical brake energy and the mechanical brake energy;
  the ratio between the requested brake energy and the mechanical brake energy, and;
  the ratio between the requested brake energy and the electrical brake energy.

The measure that is representative of a relation between the electrical brake energy and the mechanical brake energy can be expressed and calculated in different ways. One measure may e.g. be the ratio between the electrical brake energy and the mechanical brake energy for a retardation. Another measure may be the difference between the electrical brake energy and the mechanical brake energy for a retardation. Further suitable measures are e.g. the ratio between the electrical brake energy and the total brake energy or the ratio between the mechanical brake energy and the total brake energy. It would also be possible to relate the electrical brake energy or the mechanical brake energy to the requested brake energy.

The measure representative of a relation between the electrical brake energy and the mechanical brake energy may be determined by e.g. determining the requested brake power for a retardation and by determining the actual electrical brake energy and the actual mechanical brake energy during the retardation. The requested brake power is available from the control system of the vehicle and may be a measure of how hard the brake pedal is pressed by the driver. The requested brake energy may be obtained from the requested brake power integrated over the total brake time. If the vehicle is provided with other auxiliary brakes, the total sum of all requested brake power is used. The actual electrical brake energy is determined by measuring the current flow into the battery from the generator and by measuring the voltage over the battery. The actual mechanical brake energy can be obtained from the difference between the requested brake power and the actual electrical brake energy. The actual mechanical brake energy can also be obtained in other ways. e.g. by measuring the pressure in the brake system, by a displacement sensor in the brake or by measuring the wear of the brake pads.

The retardation of the vehicle is preferably relatively strong, such that the electric brake is used at its maximum and such that a part of the brake power comes from the mechanical brake. Normally, the electric machine is dimensioned such that it is intended to work at its upper limit most of the lime during normal use of the vehicle. When the electric machine is used as an electric motor, it will reach its maximum torque relatively fast and will then continue to deliver this torque until a change in the driving pattern, e.g. a gear shift, is performed. When the electric machine is used as a generator during a vehicle retardation, the generator will relatively fast deliver its maximum current to the battery and will continue to do so until the vehicle has stopped, if more brake power than the electric brake can deliver is required, an auxiliary brake will be used. Normally, the service brakes of the vehicle will be used as the auxiliary brake, but it would also be possible to use other types of brakes, such as an exhaust brake if the engine is running or a retarder of some kind.

For the determination of the efficiency of the energy system, the subsequent retardations should be similar, such that the results can be compared. One way to determine when a subsequent vehicle retardation is similar to the first vehicle retardation is to use the requested brake power combined with some vehicle parameters. The weight of the vehicle may e.g. be used as a vehicle parameter. It is not required that the weight of the vehicle is similar, but with an empty vehicle, less brake power is required to stop the vehicle. It is thus of advantage if the weight of the vehicle is in the same range for the different retardations. The speed of the vehicle at the start of the retardation may also be used as a vehicle parameter. Two retardations may be seen as similar if the required brake power differs less than 20%.

Another vehicle parameter may be the position of the vehicle. Most heavy hybrid vehicles are used as distribution trucks or passenger busses. Such vehicles often travel the same routes. They will thus retard frequently at the same position. A bus will e.g. stop at the same bus stop or will travel down the same downhill slope frequently. The position of the bus stop or the slope can thus be used to determine when a similar retardation is performed, if the time of day is also used as a parameter, the load of the bus will most likely be similar at the same time of day. In rush hours, the bus may be fall and during noon or late evenings, the bus may be almost empty. Delivery trucks often travel the same route and deliver the same amount of goods at specific locations.

By determining a measure, such as a ratio or difference, representative of a relation between the electrical brake energy and the mechanical brake energy of a first and a second vehicle retardation, a measure of the actual efficiency of the energy system can be obtained. It is of advantage if the time period between the retardations is relatively long, such that a measurable difference can be detected. The time period between the first and the second retardation is preferably several months or more. The measured retardation values are preferably stored in a memory.

It is also possible to save several subsequent retardations and to comparing these over time, such that a time dependent curve for the actual efficiency of the energy system is obtained. When the energy system is a battery, a measure of the SOH of the battery can be derived from the efficiency. One advantage of determining a true measure of the SOH is that the battery can be used in an optimal way taking account of the actual condition and not on a predicted condition. This is of advantage since different batteries age in different ways, depending on the actual use and on the build quality.

When the battery has degraded with use after one or a few years, such that, they cannot receive as much current as a new battery, the mechanical brakes will be used more during a retardation which means that the wear of the mechanical brakes will increase. This wear can also be used as a measure of how much the battery has degraded. The wear of the brake pads over time can be measured, e.g. by a displacement sensor.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
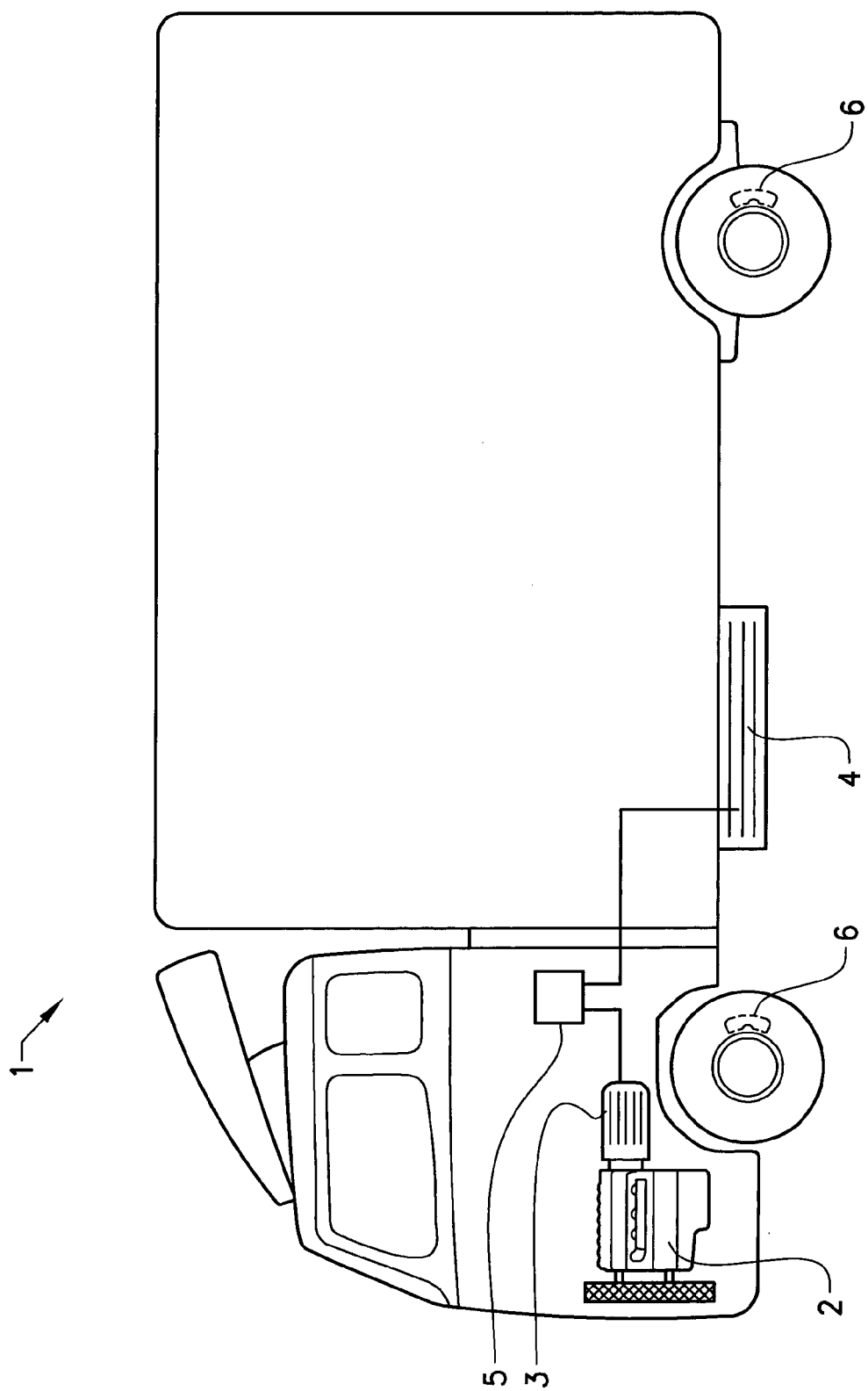
FIG. 1 shows a schematic hybrid vehicle.

FIG. 1 shows a schematic hybrid vehicle 1, here shown as a delivery truck. The hybrid vehicle may be a regular hybrid vehicle or a plug-in hybrid vehicle. Other types of heavy hybrid vehicles such as buses, refuse vehicles, wheel loaders etc. can also be used with the inventive method. The hybrid vehicle is provided with a combustion engine 2, normally a diesel engine but other types of fuels, such as liquefied natural gas or compressed natural gas, can of coarse also be used. The hybrid vehicle is also provided with an electric machine 3 connected to the engine. The electric machine is preferably positioned close to the engine but can also be placed apart from the engine, e.g. at the drive axle of the vehicle. The vehicle is provided with service brakes 6 on all wheels.

The electric machine can be used in a drive mode where it is used as an electric motor to power the vehicle. In the drive mode, it receives current from the battery 4. Depending on the type of hybrid vehicle, the electrical motor can either complement the combustion engine when extra power is needed, e.g. at starts, accelerations and upwards slopes, or it can power the complete vehicle when the combustion engine is shut off. The electric machine can also be used in a brake mode where it regenerates energy to the battery when the vehicle retards. During retardation, the electric machine is used as an electric brake and the energy is used to recharge the battery. The electric machine can also be used as a regular generator that charges the battery when the vehicle is powered by the combustion engine travelling on a relatively even road, when the electric machine is not used in the drive mode or brake mode.

The vehicle is further provided with a control unit 5 which comprises a battery management function that controls the current to and from the battery depending on instructions received from the vehicle control system, such as requested acceleration, requested speed or requested brake power. The control unit is also provided with measurement functions that can measure the current to and from the battery, battery voltage etc. The control unit communicates with the vehicle control system, over a data bus. The control unit may be a stand-alone unit or may be integrated in another control unit.

The electric machine is preferably designed to complement the combustion engine. In this way, the combustion engine can run in an optimal speed range, with optimal energy consumption and a minimum of harmful exhaust gases. The electric machine will in this case be optimized such, that it often delivers its full torque when running as an electric motor. If the combined torque from the combustion engine and the electric motor is not sufficient, e.g. at a steep slope, the speed of the combustion engine can be raised. In this way, the size of the electric machine can be held relatively small and lightweight. For the same reason, the electric machine is designed to deliver its maximum current when used as an electric brake at an average retardation. If a faster or stronger retardation is required, an auxiliary brake is used to complement the electric brake.

The requested brake power is available from the control system of the vehicle. The driver requests a wanted brake power by applying the brake pedal in a conventional way. The requested brake power is then distributed from the vehicle control system to the available brake systems. The requested brake power is measured over the complete retardation and is integrated over time such that a measure of the requested brake energy is obtained. In this case, when the requested brake power is less or equal to the brake energy that can be delivered by the electric brake, only the electric brake will be used. In this way, as much current as possible is regenerated to the battery. When the requested brake power is greater than the brake energy that can be delivered by the electric brake, an additional brake is used for the surplus brake energy. Normally, the service brakes of the vehicle are used to complement the electric brake, although it is also possible to use other types of auxiliary brakes, such as an exhaust brake or a retarder brake, for this purpose.

The actual mechanical brake energy can be obtained from the difference between the requested brake power over time and the actual electrical brake energy. The actual mechanical brake energy can also be obtained in other ways, e.g. by measuring the pressure in the brake system, by a displacement sensor in the brake or by measuring the wear of the brake pads.

The current to and from the battery is constantly monitored by the control unit, such that the control unit can determine the state of charge (SOC) of the battery. The actual state of charge may be used to determine how and when the electric machine is to be used. If the SOC indicates that the battery is more or less full, the electric brake will, only be used to a small extent, since the battery cannot absorb much current. For a vehicle travelling the same route, such as a bus, the control unit can optimize the SOC depending on e.g. the positions of the bus stops.

At specified occasions, the control unit is adapted to determine a measure representative of a relation between the electrical brake energy and the mechanical brake energy during a retardation. The retardation is preferably selected when a relatively fast or strong retardation is performed, such that both the electric brake and the mechanical brake are used. This can e.g. be done by obtaining the requested brake power for the retardation from the vehicle control system. The actual electrical brake energy during the retardation is obtained from the current to the battery. The actual mechanical brake energy during the retardation is e.g. obtained, by subtracting the electrical brake energy from the requested brake power over the time of the retardation. The actual mechanical brake energy can also be obtained in other ways, e.g., by measuring the pressure in the brake system or by a displacement sensor in the brake. From the electrical brake energy and the mechanical brake energy; a measure that is representative of a relation between the electrical brake energy and the mechanical brake energy can be calculated.

The measure that is representative of a relation between the electrical brake energy and the mechanical brake energy can also be expressed and calculated in other ways. One measure may e.g. be the ratio between the electrical brake energy and the mechanical, brake energy for a retardation. Another measure may be the difference between the electrical brake energy and the mechanical brake energy for a retardation. Further suitable measures are e.g. the ratio between the electrical brake energy and the total brake energy or the ratio between the mechanical brake energy and the total brake energy, it would also be possible to relate the electrical brake energy or the mechanical brake energy to the requested brake energy.

The ratio between the electrical brake energy and the mechanical brake energy is obtained by dividing the electrical brake energy with the mechanical brake energy. The ratio is saved in a memory. The difference between the electrical brake energy and the mechanical brake energy is obtained e.g. by subtracting the electrical brake energy from the mechanical brake energy. This difference is saved in a memory.

At a later occasion, a new measure representative of a relation between the electrical brake energy and the mechanical brake energy is determined. The new measure is preferably determined at a retardation similar to the first retardation. One way to determine if the retardation is similar to the first retardation is to compare the requested brake power at the different occasions. Another way is to select a retardation at the same position as the first retardation. Since most heavy hybrid vehicles travel similar routes, they will most likely return to the same position several times. Busses and refuse vehicles will mostly travel the same route, sometimes with an offset of a week or two. A measure may in this case be determined every second week at a specific position where the vehicle has to brake, e.g. at a specific downhill position. The new measure may be stored in the memory or may be compared with the first, measure and the result of the comparison may be stored for later analysts.

In one example, a measure may be taken for a specific complete bus route, e.g. from the starting bus stop to the terminal station, in this case, the total requested brake energy for the complete bus route is measured. At the same time, the total electrical brake energy for the complete bus route is also measured, i.e. for the total retardation of the bus over the complete bus route. Preferably, the bus route is provided with one or several steep downhill slopes. A measure is e.g. taken every month and is stored in a memory. These measures are used to determine a relation between the electrical brake energy and the mechanical brake energy.

After a longer time period, e.g. a year or more, several measures have been determined. They can be compared and the difference between the first measure and the last measure can be used as a measure of the degradation of the energy system, in this case the battery, it is also possible to use all measures in order to see the shape of the degradation, since the degradation may not be linear. The actual efficiency of the energy system can thus be obtained. This efficiency can be used to determine the actual state of health (SOH) of the battery. The advantage of having knowledge of the actual SOH is that the limitations to the charging and the discharging of the battery can be adapted to the actual SOH of the battery. Since different batteries age differently, depending e.g. on the production and type of use, this means that each battery ears be used in an optimal way and that the batteries does not have to be replaced earlier than necessary.

In one development of the method, the wear of the brake pads are used to determine the efficiency of the energy system. During use of the vehicle, the total electric brake energy is measured and stored in a memory. After a predetermined time period, or travelled distance, e.g. when the brake pads are to be replaced, the actual wear of the brake pads is measured. The wear of the brake pads can be measured e.g. by measuring the thickness of the brake pads or by weighting the brake pads. From the wear of the brake pads, the total mechanical brake energy used to wear the brake pads can be retrieved. The total electric brake energy is then compared with the total mechanical brake energy for the same time period. The ratio between the used electrical brake energy and the mechanical brake energy gives a measure of the efficiency of the energy system of the vehicle, in this case the battery.

Figure 2:
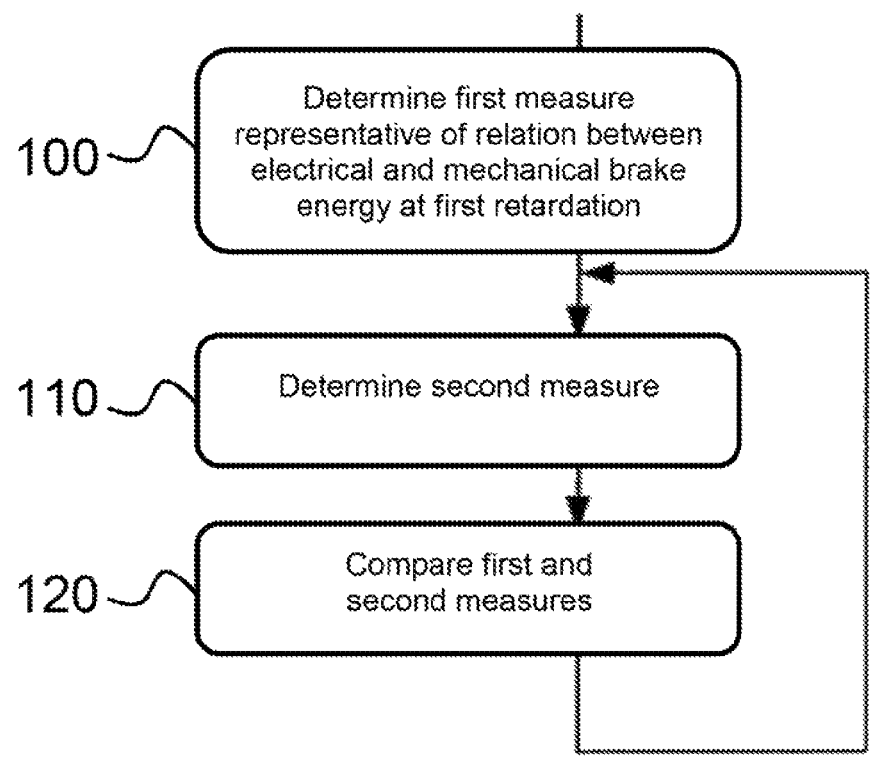
FIG. 2 shows a schematic flow chart of an inventive method for determining the efficiency of the energy system of the hybrid vehicle.

FIG. 2 shows a schematic flow chart of the method for determining the efficiency of an energy system of a hybrid vehicle. The method is performed during use of the vehicle, at specified time intervals, where a time interval preferably is in the range of one or several weeks or more. The method steps are preferably performed by a computer program and a computer program product contained and run in the electronic control system of the vehicle.

In step 100, the measure representative of a relation between the electrical brake energy and the mechanical brake energy is determined at a first retardation. The determination is performed during a relatively strong retardation which requires more brake energy than the available electrical brake energy. The requested brake power over time is obtained from the vehicle control system. The actual electrical brake energy is determined by measuring the current flow into the battery from the generator and by measuring the voltage over the battery. The actual mechanical brake energy can e.g. be obtained from the difference between the requested brake power over time and the actual electrical brake energy.

In step 110, a second measure representative of a relation between the electrical brake energy and the mechanical brake energy is determined during a similar retardation. The new measure is determined after a predefined time interval.

In step 120, the first measure representative of a relation between the electrical brake energy and the mechanical brake energy is compared with the second measure representative of a relation between the electrical brake energy and the mechanical brake energy. The method is then repeated, such that new measures are determined repeatedly at predefined time intervals. The difference between the measures can be used as a measure of the degradation of the energy system of the vehicle. The actual efficiency of the energy system can thus be obtained. This efficiency can also be used to determine the actual state of health (SOH) of the battery in the energy system. The steps 100 to 120 can be programmed into a computer controlled unit, such as the control unit 5.

The invention is not to be regarded as being limited to the embodiments described above, a number of additional variants and modifications being possible within the scope of the subsequent patent claims.

| REFERENCE SIGNS | |
| --- | --- |
| 1: Hybrid vehicle | |
| 2: Engine | |
| 3: Electric machine | 4: Battery |
| 5: Control unit | |
| 6: Service brakes | |

The invention claimed is:

1. A method for determining the efficiency of an electric energy system of a hybrid vehicle comprising a combustion engine, an electric machine, service brakes and an electric storage system, comprising:
   determining, via a sensor, a requested brake energy for a first vehicle retardation and determining, via another sensor, an actual electrical brake energy in the electric machine of the hybrid vehicle during the first vehicle retardation, and determining an actual mechanical brake energy in the service brakes of the hybrid vehicle during the vehicle retardation,
   determining, via a control unit, a measure representative of a relation between the electrical brake energy and the mechanical brake energy,
   determining, via the control unit, a new measure representative of a relation between the electrical brake energy and the mechanical brake energy at a subsequent second similar vehicle retardation,
   comparing, via the control unit, the determined measures representative of a relation between the electrical brake energy and the mechanical brake energy of the first and the second vehicle retardations, obtaining, via the control unit, the actual efficiency of the energy system from a change in the measure representative of a relation between the electrical brake energy and the mechanical brake energy of the first and the second vehicle retardations and adapting the charging or discharging properties of the electric storage system as a function of the actual efficiency.

2. Method according to claim 1, wherein the measure representative of a relation between the electrical brake energy and the mechanical brake energy is the ratio between the electrical brake energy and the mechanical brake energy.

3. Method according to claim 1, wherein the measure representative of a relation between the electrical brake energy and the mechanical brake energy is the ratio between the requested brake energy and the mechanical brake energy.

4. Method according to claim 1, wherein the measure representative of a relation between the electrical brake energy and the mechanical brake energy is the ratio between the requested brake energy and the electrical brake energy.

5. Method according to claim 1, wherein the time interval between the first and the second vehicle retardations is longer than a day.

6. Method according to claim 1, wherein the time interval between the first and the second vehicle retardations is longer than a week.

7. Method according to claim 1, wherein the time interval between the first and the second vehicle retardations is longer than one year.

8. Method according to claim 1, wherein the total of electrical brake energy used by the vehicle during retardations is saved in a memory and is compared with the total of mechanical brake energy used by the vehicle over a predefined time period.

9. Method according to claim 8, wherein the predefined time period is longer than one year.

10. Method according to claim 8, wherein the predefined time period corresponds to a regular service interval of the vehicle.

11. Method according to claim 8, wherein the predefined time period corresponds to the life length of the brake pads of the service brakes.

12. Method according to claim 11, wherein the total mechanical brake energy is obtained by measuring the wear of the brake pads over the predefined time period.

13. Method according to claim 11, wherein the total mechanical brake energy is obtained by subtracting the total electrical brake energy from the total requested brake energy over the predefined time period.

14. Method according to claim 1, wherein the determined efficiency of the energy system is used to determine the state of health of a battery comprised in the electric storage system.

15. A hybrid vehicle comprising a combustion engine, an electric machine, an electric storage system, mechanical service brakes and a control unit, where the control unit is arranged to determine the efficiency of an electric energy system of the hybrid vehicle by:
   determining a requested brake energy for a first vehicle retardation and determining an actual electrical brake energy in the electric machine of the hybrid vehicle and an actual mechanical brake energy in the service brakes of the hybrid vehicle during the vehicle retardation,
   determining a measure representative of a relation between the electrical brake energy and the mechanical brake energy,
   determining a new measure representative of a relation between the electrical brake energy and the mechanical brake energy at a subsequent second similar vehicle retardation,
   comparing the determined measures representative of a relation between the electrical brake energy and the mechanical brake energy of the first and the second vehicle retardations,
   where the actual efficiency of the energy system is obtained from the change in the measure representative of a relation between the electrical brake energy and the mechanical brake energy of the first and the second vehicle retardations.

16. Hybrid vehicle according to claim 15, wherein the hybrid vehicle is a plug-in hybrid vehicle.

17. A computer comprising program code stored on a non-transitory computer readable medium for performing all the steps of claim 1 when the program is run on the computer.

18. A computer program product comprising program code stored on a non-transitory computer readable medium for performing all the steps of claim 1 when the program product is run on a computer.

19. Method according to claim 1, comprising replacing a component of the electric storage system when the actual efficiency of the energy system falls below a threshold.

* * * * *